(12) United States Patent
Pan et al.

(10) Patent No.: US 9,214,984 B2
(45) Date of Patent: Dec. 15, 2015

(54) INTERFERENCE CANCELLATION METHOD AND SYSTEM

(71) Applicant: Huawei Technologies Co., Ltd., Shenzhen, Guangdong (CN)

(72) Inventors: Yongchao Pan, Shanghai (CN); Bitao Li, Shanghai (CN); Liang Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 14/314,413

(22) Filed: Jun. 25, 2014

(65) Prior Publication Data

US 2014/0314127 A1    Oct. 23, 2014

Related U.S. Application Data

(63) Continuation of application No. PCT/CN2012/086833, filed on Dec. 18, 2012.

(30) Foreign Application Priority Data

Dec. 30, 2011    (CN) .......................... 2011 1 0455541

(51) Int. Cl.
    *H04B 1/00*    (2006.01)
    *H04B 1/7103*    (2011.01)
    *H04B 1/7107*    (2011.01)

(52) U.S. Cl.
    CPC ............ *H04B 1/7103* (2013.01); *H04B 1/7107* (2013.01); *H04B 1/71075* (2013.01)

(58) Field of Classification Search
    USPC .......................... 375/316, 340–341, 346–350
    See application file for complete search history.

(56) References Cited

U.S. PATENT DOCUMENTS

| | | | | |
|---|---|---|---|---|
| 5,341,395 | A * | 8/1994 | Bi ................................. | 370/342 |
| 6,137,788 | A * | 10/2000 | Sawahashi et al. ........... | 370/342 |
| 7,324,584 | B1 | 1/2008 | Vigneron et al. | |
| 2003/0067969 | A1 | 4/2003 | Choi et al. | |
| 2007/0165696 | A1* | 7/2007 | Agrawal ....................... | 375/136 |
| 2009/0296786 | A1* | 12/2009 | Massicotte et al. ........... | 375/148 |
| 2010/0329389 | A1* | 12/2010 | Ishihara et al. ............... | 375/316 |
| 2013/0223501 | A1* | 8/2013 | Kalyanasundaram et al. ............................. | 375/227 |
| 2013/0225144 | A1* | 8/2013 | Fleming et al. ............... | 455/418 |

FOREIGN PATENT DOCUMENTS

| | | |
|---|---|---|
| CN | 1400758 A | 3/2003 |
| CN | 1505294 A | 6/2004 |
| CN | 101127536 A | 2/2008 |
| CN | 102545958 A | 7/2012 |
| WO | WO 01/29983 A1 | 4/2001 |

* cited by examiner

*Primary Examiner* — Khanh C Tran

(57) ABSTRACT

Embodiments of the present invention relate to an interference cancellation method and system. The interference cancellation system of the present invention includes a centralized cancellation unit and at least two signal processing units, where at least a part of signal processing units in the at least two signal processing units are configured to detect at least a part of user signals in all user signals input into the interference cancellation system and reconstruct the detected user signals; the centralized cancellation unit is configured to perform cancellation on reconstructed signals and the user signals input into the interference cancellation system; and the at least two signal processing units are configured to detect, according to a residual signal after the cancellation, the user signals input into the interference cancellation system and output the detected signals.

18 Claims, 4 Drawing Sheets

INTERFERENCE CANCELLATION METHOD AND SYSTEM

CROSS-REFERENCE TO RELATED APPLICATIONS

This application is a continuation of International Application No. PCT/CN2012/086833 filed on Dec. 18, 2012, which claims priority to Chinese Patent Application No. 201110455541.X, filed on Dec. 30, 2011, both of which are hereby incorporated by reference in their entireties.

TECHNICAL FIELD

The present invention relates to the field of communications, and in particular, to a signal processing unit, and an interference cancellation (IC) method, apparatus, and system.

BACKGROUND

A code division multiple access (CDMA) system is widely applied because of its advantages such as high capacity, high service quality, and good confidentiality. Because the CDMA system differentiates a user according to a feature code, in a mobile communication environment, a problem of multiple access interference (MAI) exists. However, in the CDMA system, a problem of near-far interference exists, that is, because distances between users and a base station or fading depths of user signals are different, a strong signal suppresses a weak signal, so that a weak user signal cannot be normally detected. Currently, user signal detection may be classified into a single-user detection technology and a multi-user detection technology. Interference cancellation is widely applied as a multi-user detection technology. An interference cancellation system in the prior art is adverse to improvement of a gain of a user signal after interference cancellation.

SUMMARY

Embodiments of the present invention provide a signal processing unit, and an interference cancellation method, apparatus, and system, which can improve a gain of a user signal after interference cancellation.

An interference cancellation system provided in an embodiment of the present invention includes a centralized cancellation unit and at least two signal processing units, where at least a part of signal processing units in the at least two signal processing units are configured to perform multi-user detection on at least a part of user signals in all user signals input into the interference cancellation system, and reconstruct the detected user signals to obtain reconstructed signals; the centralized cancellation unit is configured to perform cancellation on the reconstructed signals and all the user signals input into the interference cancellation system to obtain a residual signal after the cancellation, and feed back the residual signal to the at least two signal processing units; and the at least two signal processing units are configured to perform, according to the residual signal, multi-user detection on all the user signals input into the interference cancellation system, and output the detected signals.

An interference cancellation method provided in an embodiment of the present invention includes: performing, by at least a part of signal processing units in at least two signal processing units, multi-user detection on at least a part of user signals in all user signals that require interference cancellation, and reconstructing the detected user signals to obtain reconstructed signals; performing cancellation on all the user signals that require interference cancellation and the reconstructed signals to obtain a residual signal after the cancellation, and feeding back the residual signal to the at least two signal processing units; and performing, by the at least two signal processing units and according to the residual signal, multi-user detection on all the user signals that require interference cancellation, and outputting the detected signals.

An interference cancellation apparatus provided in an embodiment of the present invention includes: a receiving unit, configured to receive reconstructed signals obtained after at least a part of signal processing units in at least two signal processing units perform multi-user detection on and reconstruct user signals, where the user signals are at least a part of user signals in all user signals that require interference cancellation; a cancellation unit, configured to perform cancellation on all the user signals that require interference cancellation and the reconstructed signals to obtain a residual signal; and a sending unit, configured to send the residual signal to the at least two signal processing units, so that the at least two signal processing units perform, according to the residual signal, multi-user detection on all the user signals that require interference cancellation.

An interference cancellation method provided in an embodiment of the present invention includes: receiving reconstructed signals obtained after at least a part of signal processing units in at least two signal processing units perform multi-user detection on and reconstruct user signals, where the user signals are at least a part of user signals in all user signals that require interference cancellation; performing cancellation on all the user signals that require interference cancellation and the reconstructed signals to obtain a residual signal after the cancellation; and sending the residual signal to the at least two signal processing units, so that the at least two signal processing units perform, according to the residual signal, multi-user detection on all the user signals that require interference cancellation.

An interference cancellation method provided in an embodiment of the present invention includes: receiving a residual signal sent by a centralized cancellation unit, where the residual signal is a residual signal obtained after cancellation is performed on all user signals that require interference cancellation and reconstructed signals, and the reconstructed signals are reconstructed signals obtained after multi-user detection and reconstruction are performed on at least a part of user signals in all the user signals that require interference cancellation; and performing, according to the residual signal, multi-user detection on user signals to be detected, where the user signals to be detected are a part of user signals in all the user signals that require interference cancellation.

A signal processing unit provided in an embodiment of the present invention includes: a receiving unit, configured to receive a residual signal sent by a centralized cancellation unit, where the residual signal is a residual signal obtained after cancellation is performed on all user signals that require interference cancellation and reconstructed signals, and the reconstructed signals are reconstructed signals obtained after multi-user detection and reconstruction are performed on at least a part of user signals in all the user signals that require interference cancellation; and a detection unit, configured to perform, according to the residual signal, multi-user detection on user signals to be detected, where the user signals to be detected are a part of user signals in all the user signals that require interference cancellation.

In the interference cancellation method in the embodiments of the present invention, cancellation is performed on reconstructed signals of at least apart of user signals and all input user signals, a residual signal after the cancellation includes an interference signal between user signals of different signal processing units, and the at least two signal processing units perform multi-user detection on user signals according to the residual signal after the cancellation. In a process of performing multi-user detection on user signals, a signal processing unit uses an interference signal of a user signal in another signal processing unit on a user signal in the signal processing unit; therefore, a user signal in each signal processing unit can be enabled to use a cancellation gain of a user signal of another signal processing unit, which is advantageous to improvement of a gain of a user signal detected and output by the signal processing unit.

DETAILED DESCRIPTION

Figure 1:
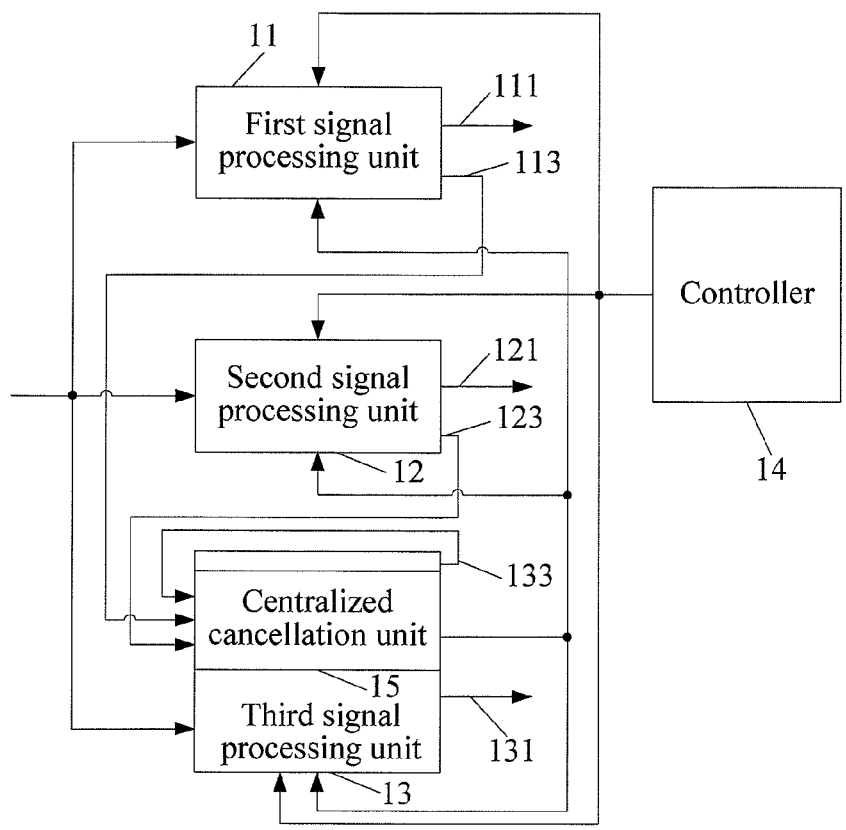
FIG. 1 is a schematic diagram of one embodiment of an interference cancellation system according to the present invention.

An embodiment of an interference cancellation system of the present invention includes a centralized cancellation unit and at least two signal processing units. The centralized cancellation unit may be disposed in one of the at least two signal processing units, and the centralized cancellation unit may also be disposed separately. Each signal processing unit corresponds to a board, and is configured to process a user signal on the board.

At least a part of signal processing units in the at least two signal processing units are configured to perform multi-user detection on at least a part of user signals in all user signals input into the interference cancellation system, reconstruct the detected user signals to obtain reconstructed signals, and input the reconstructed signals into the centralized cancellation unit. The centralized cancellation unit is configured to perform cancellation on the reconstructed signals and all the user signals input into the interference cancellation system to obtain a residual signal after the cancellation, and feed back the residual signal to the at least two signal processing units. Specifically, the residual signal is a residual signal obtained after the centralized cancellation unit subtracts the reconstructed signals from all the user signals input into the interference cancellation system. The at least two signal processing units are configured to perform, according to the residual signal, multi-user detection on all the user signals input into the interference cancellation system, and output the detected signals. All the user signals input into the interference cancellation system may be user signals in a cell.

Furthermore, the interference cancellation system may further include a controller. Each signal processing unit of the at least two signal processing units receives all the user signals input into the interference cancellation system, and the controller is configured to control each signal processing unit to select a part of user signals from all the received user signals, so that each signal processing unit performs multi-user detection on the selected user signals.

Each signal processing unit in the at least two signal processing units may include a detection unit. The at least a part of signal processing units may perform the multi-user detection on the at least a part of user signals by adopting the detection unit. The at least two signal processing units may perform, according to the residual signal and by adopting the detection unit, the multi-user detection on all the user signals input into the interference cancellation system.

The detection unit includes a despreading unit, a demodulation unit, and a decoding unit. The despreading unit is configured to remove a spreading code from a user signal; the demodulation unit is configured to demodulate the user signal from which the spreading code is removed; and the decoding unit is configured to decode the demodulated user signal, and output a bit sequence of the user signal.

The at least a part of signal processing units in the at least two signal processing units further include a signal reconstruction unit, configured to reconstruct a detected user signal. The signal reconstruction unit includes: a coding unit, a modulation unit, and a spreading unit. The coding unit is configured to code a signal output by the detection unit; the modulation unit is configured to modulate the coded signal; and the spreading unit is configured to perform spreading on the modulated signal. Specifically, if all the user signals input into the interference cancellation system are baseband user signals, the reconstructed signals are also baseband user signals.

The interference cancellation system in this embodiment includes the centralized cancellation unit, where the centralized cancellation unit performs the cancellation on the reconstructed signals of the at least a part of user signals and all the input user signals, the residual signal after the cancellation includes an interference signal between user signals of different signal processing units, and the at least two signal processing units perform the multi-user detection on the user signals according to the residual signal after the cancellation. In a process of performing multi-user detection on user signals, a signal processing unit in this embodiment uses an interference signal of a user signal in another signal processing unit on a user signal in the signal processing unit; therefore, the interference cancellation system in this embodiment can enable a user signal in each signal processing unit to use a cancellation gain of a user signal of another signal processing unit, which is advantageous to improvement of a gain of a user signal detected and output by the signal processing unit.

Then, an example that the interference cancellation system includes three signal processing units and the centralized cancellation unit is disposed in one of the signal processing units is taken to further describe the foregoing embodiment. FIG. 1 is a schematic diagram of one embodiment of an interference cancellation system according to the present invention. The interference cancellation system in this embodiment includes a first signal processing unit 11, a second signal processing unit 12, a third signal processing unit 13, a controller 14, and a centralized cancellation unit 15.

User signals are input into the first, second, and third signal processing units 11, 12, and 13. The user signals may be user signals in a cell. For the convenience of description, it is assumed that the user signals include a first user signal, a second user signal, and a third user signal. The first, second, and third signal processing units 11, 12, and 13 each receive the first, second, and third user signals.

The controller 14 controls the first signal processing unit 11 to select the first user signal from the received first, second, and third user signals. The first signal processing unit 11 detects the first user signal, and then, reconstructs the detected first user signal to obtain a reconstructed signal of the first user signal. The first signal processing unit 11 sends the reconstructed signal of the first user signal to the centralized cancellation unit 15 through an output end 113. The controller 14 controls the second signal processing unit 12 to select the second user signal from the received first, second, and third user signals. The second signal processing unit 12 detects the second user signal, and then, reconstructs the detected second user signal to obtain a reconstructed signal of the second user signal. The second signal processing unit 12 sends the reconstructed signal of the second user signal to the centralized cancellation unit 15 through an output end 123. The controller 14 controls the third signal processing unit 13 to select the third user signal from the received first, second, and third user signals. The third signal processing unit 13 detects the third user signal, and then, reconstructs the detected third user signal to obtain a reconstructed signal of the third user signal. The third signal processing unit 13 sends the reconstructed signal of the third user signal to the centralized cancellation unit 15 through an output end 133.

Specifically, a process in which the first, second, and third signal processing units 11, 12, and 13 detect the first, second, and third user signals includes: The first, second, and third signal processing units 11, 12, and 13 despread, demodulate, and decode the first, second, and third user signals through a multi-path search and channel estimation, so as to output bit sequences of the detected first, second, and third user signals. A process in which the first, second, and third signal processing units 11, 12, and 13 reconstruct the detected first, second, and third user signals includes: performing coding, modulation and spreading on the detected signals to obtain reconstructed signals. If the user signals input into the first, second, and third signal processing units 11, 12, and 13 are baseband signals, the reconstructed signals are also baseband signals.

The centralized cancellation unit 15 receives the reconstructed signals of the first, second, and third user signals, and performs cancellation on the reconstructed signals of the first, second, and third user signals and the first, second, and third user signals to obtain a residual signal after the cancellation. Specifically, the residual signal may be a residual signal obtained after the centralized cancellation unit 15 subtracts the reconstructed signals of the first, second, and third user signals from the first, second, and third user signals. The residual signal includes interference signals between the first, second, and third user signals. The centralized cancellation unit 15 feeds back the residual signal after the cancellation to the first, second, and third signal processing units 11, 12, and 13.

The first signal processing unit 11 receives the residual signal after the cancellation that is sent by the centralized cancellation unit 15, detects the first user signal according to the residual signal, and outputs the detected signal through an output end 111. Specifically, the first signal processing unit 11 despreads, demodulates, and decodes the first user signal by using the residual signal, and outputs a decoded bit sequence through the output end 111. The second signal processing unit 12 receives the residual signal after the cancellation that is sent by the centralized cancellation unit 15, detects the second user signal according to the residual signal, and outputs the detected signal through an output end 121. Specifically, the second signal processing unit 12 despreads, demodulates, and decodes the second user signal by using the residual signal, and outputs a decoded bit sequence through the output end 121. The third signal processing unit 13 receives the residual signal after the cancellation that is sent by the centralized cancellation unit 15, detects the third user signal according to the residual signal, and outputs the detected signal through an output end 131. Specifically, the third signal processing unit 13 despreads, demodulates, and decodes the third user signal by using the residual signal, and outputs a decoded bit sequence through the output end 131.

In this embodiment, the centralized cancellation unit 15 performs the cancellation on the reconstructed signals of the first, second, and third user signals and the first, second, and third user signals to obtain the residual signal after the cancellation. The residual signal after the cancellation includes the interference signals between the first, second, and third user signals. The first signal processing unit 11 detects the first user signal according to the residual signal, and because the residual signal includes an interference signal of the second user signal on the first user signal, and an interference signal of the third user signal on the first user signal, the first signal processing unit 11 uses the interference signals of the second and third user signals on the first user signal in a process of despreading, demodulating, and decoding the first user signal; therefore, in this embodiment, a user signal in the first signal processing unit can use cancellation gains of user signals in the second and third signal processing units, which is advantageous to improvement of a gain of a detected signal output by the first signal processing unit. According to a similarity principle, the interference cancellation system in this embodiment is also advantageous to improvement of gains of detected signals output by the second and third signal processing units.

Figure 2:
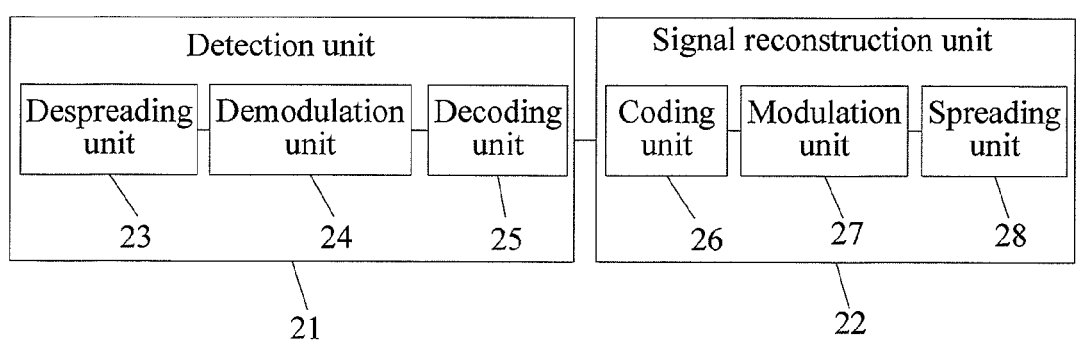
FIG. 2 is a schematic diagram of a signal processing unit in the interference cancellation system shown in FIG. 1.

FIG. 2 is a schematic diagram of a signal processing unit in the interference cancellation system shown in FIG. 1. Each signal processing unit shown in FIG. 1 includes: a detection unit 21 and a signal reconstruction unit 22. The detection unit 21 is configured to perform multi-user detection on a user signal selected by a signal processing unit, and the signal reconstruction unit 22 is configured to reconstruct the detected user signal. The detection unit 21 includes a despreading unit 23, a demodulation unit 24, and a decoding unit 25. The despreading unit 23 is configured to remove a spreading code from the selected user signal. The demodulation unit 24 is configured to demodulate the user signal from which the spreading code is removed. The decoding unit 25 is configured to decode the demodulated user signal to obtain a bit sequence of the selected user signal. The signal reconstruction unit 22 includes: a coding unit 26, a modulation unit 27, and a spreading unit 28. The coding unit 26 is configured to code a signal output by the detection unit. The modulation unit 27 is configured to modulate the coded signal. The spreading unit 28 is configured to perform spreading on the modulated signal to obtain the reconstructed signal.

Figure 3:
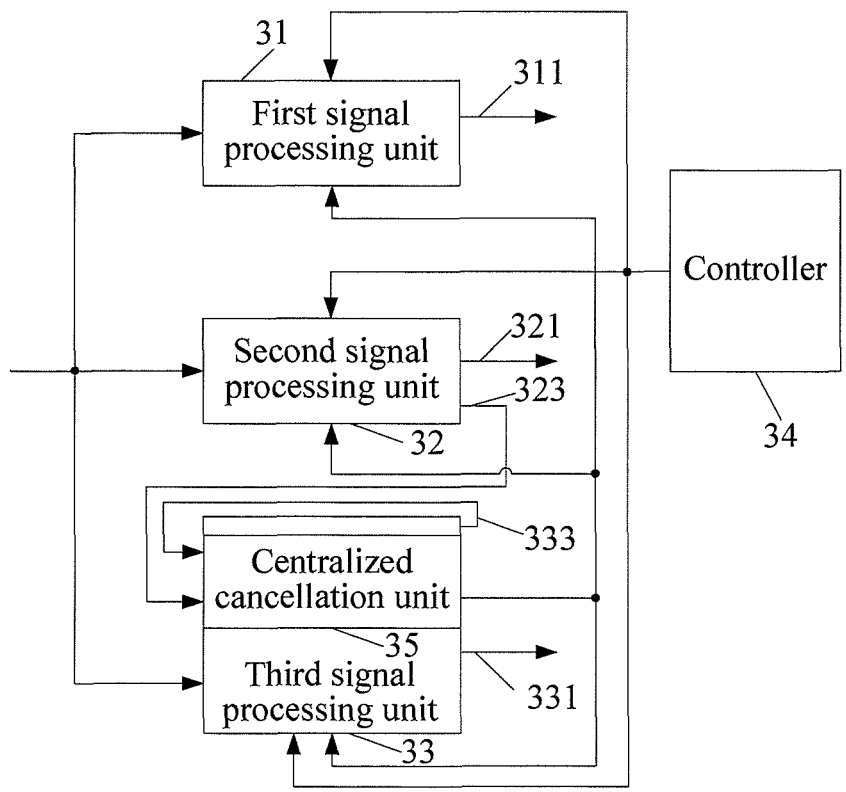
FIG. 3 is a schematic diagram of another embodiment of an interference cancellation system according to the present invention.

FIG. 3 is a schematic diagram of another embodiment of an interference cancellation system according to the present invention. The interference cancellation system in this embodiment includes a first signal processing unit 31, a second signal processing unit 32, a third signal processing unit 33, a controller 34, and a centralized cancellation unit 35.

User signals are input into the first, second, and third signal processing units 31, 32, and 33. The user signals may be user signals in a cell. For the convenience of description, it is assumed that the user signals include a first user signal, a second user signal, and a third user signal. The first, second, and third signal processing units 31, 32, and 33 each receive the first, second, and third user signals.

The controller 34 controls the first signal processing unit 31 to select the first user signal from the received first, second, and third user signals. The controller 34 controls the second signal processing unit 32 to select the second user signal from the received first, second, and third user signals. The second signal processing unit 32 detects the second user signal, and then, reconstructs the detected second user signal. The second signal processing unit 32 sends a reconstructed signal of the second user signal to the centralized cancellation unit 35 through an output end 323. The controller 34 controls the third signal processing unit 33 to select the third user signal from the received first, second, and third user signals. The third signal processing unit 33 detects the third user signal, and then, reconstructs the detected third user signal. The third signal processing unit 33 sends a reconstructed signal of the third user signal to the centralized cancellation unit 35 through an output end 333.

Specifically, a process in which the second and third signal processing units 32 and 33 detect the second and third user signals includes: The second and third signal processing units 32 and 33 despread, demodulate, and decode the second and third user signals through a multi-path search and channel estimation, so as to output bit sequences of the detected second and third user signals. A process in which the second and third signal processing units 32 and 33 reconstruct the detected second and third user signals includes: performing coding, modulation and spreading on the detected signals to obtain reconstructed signals. If the user signals input into the first, second, and third signal processing units 31, 32, and 33 are baseband user signals, the reconstructed signals are also baseband user signals.

The centralized cancellation unit 35 receives the reconstructed signals of the second and third user signals, and performs cancellation on the reconstructed signals of the second and third user signals and the first, second, and third user signals, so as to obtain a residual signal after the cancellation. Specifically, the residual signal may be a residual signal obtained after the centralized cancellation unit 35 subtracts the reconstructed signals of the second and third user signals from the first, second, and third user signals. The residual signal includes the first user signal and interference signals between the first, second, and third user signals. The centralized cancellation unit 35 feeds back the residual signal after the cancellation to the first, second, and third signal processing units 31, 32, and 33.

The first signal processing unit 31 receives the residual signal after the cancellation that is sent by the centralized cancellation unit 35, detects the first user signal according to the residual signal, and outputs the detected signal through an output end 311. Specifically, the first signal processing unit 31 despreads, demodulates, and decodes the first user signal by using the residual signal, and outputs a decoded bit sequence through the output end 311. The second signal processing unit 32 receives the residual signal after the cancellation that is sent by the centralized cancellation unit 35, detects the second user signal according to the residual signal, and outputs the detected signal through an output end 321. Specifically, the second signal processing unit 32 despreads, demodulates, and decodes the second user signal by using the residual signal, and outputs a decoded bit sequence through the output end 321. The third signal processing unit 33 receives the residual signal after the cancellation that is sent by the centralized cancellation unit 35, detects the third user signal according to the residual signal, and outputs the detected signal through an output end 331. Specifically, the third signal processing unit 33 despreads, demodulates, and decodes the third user signal by using the residual signal, and outputs a decoded bit sequence through the output end 331.

In this embodiment, the centralized cancellation unit 35 performs the cancellation on the reconstructed signals of the second and third user signals and the first, second, and third user signals to obtain the residual signal after the cancellation. The first signal processing unit 31 detects the first user signal according to the residual signal, and because the residual signal includes an interference signal of the second user signal on the first user signal, and an interference signal of the third user signal on the first user signal, the first signal processing unit 31 uses the interference signals of the second and third user signals on the first user signal in a process of despreading, demodulating, and decoding the first user signal; therefore, in this embodiment, a user signal in the first signal processing unit can use cancellation gains of user signals in the second and third signal processing units, which is advantageous to improvement of a gain of a detected signal output by the first signal processing unit. The second signal processing unit 32 detects the second user signal according to the residual signal, and because the residual signal includes an interference signal of the third user signal on the second user signal, and an interference signal of the first user signal on the second user signal, the second signal processing unit 32 uses the interference signals of the first and third user signals on the second user signal in a process of despreading, demodulating, and decoding the second user signal; therefore, in this embodiment, a user signal in the second signal processing unit can use cancellation gains of user signals in the first and third signal processing units, which is advantageous to improvement of a gain of a detected signal output by the second signal processing unit. The third signal processing unit 33 detects the third user signal according to the residual signal, and because the residual signal includes an interference signal of the second user signal on the third user signal, and an interference signal of the first user signal on the third user signal, the third signal processing unit 33 uses the interference signals of the first and second user signals on the third user signal in a process of despreading, demodulating, and decoding the third user signal; therefore, in this embodiment, a user signal in the third signal processing unit can use cancellation gains of user signals in the first and second signal processing units, which is advantageous to improvement of a gain of a detected signal output by the third signal processing unit.

Furthermore, the first, second, and third signal processing units 31, 32, and 33 may include the detection unit shown in FIG. 2, and the second and third signal processing units 32 and 33 may further include the signal reconstruction unit shown in FIG. 2, which are not repeatedly described herein.

Figure 4:
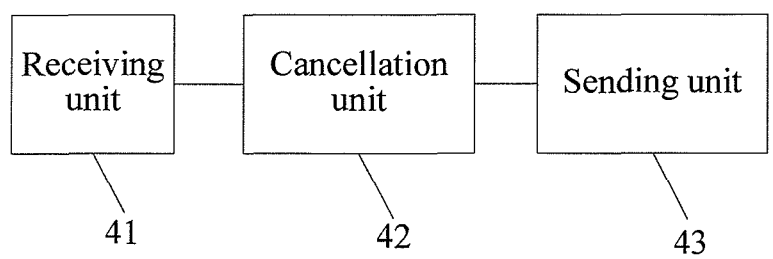
FIG. 4 is a schematic diagram of an embodiment of an interference cancellation apparatus according to the present invention.

FIG. 4 is a schematic diagram of an embodiment of an interference cancellation apparatus according to the present invention. The interference cancellation apparatus in this embodiment mainly includes a receiving unit 41, a cancellation unit 42, and a sending unit 43. The receiving unit 41 is configured to receive reconstructed signals obtained after at least a part of signal processing units in at least two signal processing units detect and reconstruct user signals, where the user signals are at least a part of user signals in all user signals that require interference cancellation. All the user signals that require interference cancellation may be user signals in a cell. If all the user signals that require interference cancellation are baseband user signals, the reconstructed signals are also reconstructed baseband user signals.

The cancellation unit 42 is configured to perform cancellation on the reconstructed signals and all the user signals that require interference cancellation. The sending unit 43 is configured to send a residual signal after the cancellation to the at least two signal processing units, so that the at least two signal processing units perform, according to the residual signal after the cancellation, multi-user detection on all the user signals that require interference cancellation. The residual signal includes a residual signal obtained after subtracting the reconstructed signals from all the user signals that require interference cancellation.

In this embodiment, the interference cancellation apparatus receives the reconstructed signals sent by the at least a part of signal processing units in the at least two signal processing units, performs the cancellation on the reconstructed signals and all the user signals that require interference cancellation, and sends the residual signal after the cancellation to the at least two signal processing units. Because the residual signal after the cancellation includes an interference signal between user signals of different signal processing units, the interference cancellation apparatus in this embodiment enables a signal processing unit to use an interference signal of a user signal in another signal processing unit on a user signal in the signal processing unit when the signal processing unit performs multi-user detection on the user signal; therefore, the interference cancellation apparatus in this embodiment can enable a user signal in each signal processing unit to use a cancellation gain of a user signal in another signal processing unit, which is advantageous to improvement of a gain of a user signal detected and output by the signal processing unit.

Figure 5:
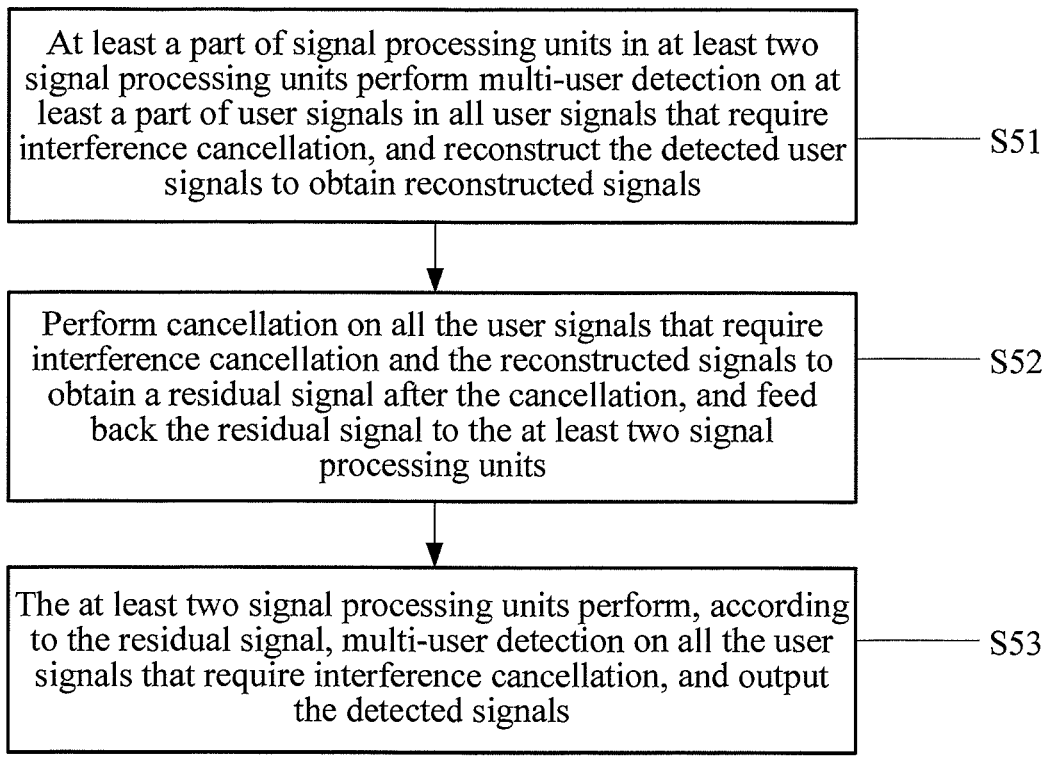
FIG. 5 is a flowchart of a first embodiment of an interference cancellation method according to the present invention.

FIG. 5 is a flowchart of a first embodiment of an interference cancellation method according to the present invention. The interference cancellation method in this embodiment includes:

S51: At least a part of signal processing units in at least two signal processing units detect at least a part of user signals in user signals that require interference cancellation, and reconstructs the detected signals. The user signals that require interference cancellation may be user signals in a cell. Specifically, if the user signals that require interference cancellation are baseband signals, the reconstructed signals are baseband signals.

Furthermore, each signal processing unit in the at least two signal processing units receives the user signals that require interference cancellation, and each signal processing unit selects a part of user signals from the received user signals that require interference cancellation and detects the part of user signals, and then, reconstructs the detected user signals.

The detecting the user signals includes: removing spreading codes from the user signals; demodulating the user signals from which the spreading codes are removed; and decoding the demodulated user signals, and outputting bit sequences of the user signals. The reconstructing the detected user signals includes: coding the detected user signals; modulating the coded signals; and performing spreading on the modulated signals.

S52: Perform cancellation on the reconstructed signals and the user signals that require interference cancellation, and send a residual signal after the cancellation to the at least two signal processing units. The residual signal includes a signal obtained after subtracting the reconstructed signals from the user signals that require interference cancellation.

S53: The at least two signal processing units detect, according to the residual signal after the cancellation, the user signals that require interference cancellation, and output the detected signals. Specifically, the detecting the user signals includes: removing spreading codes from the user signals; demodulating the user signals from which the spreading codes are removed; and decoding the demodulated user signals, and outputting bit sequences of the user signals.

In the interference cancellation method in this embodiment, the at least apart of user signals in the user signals are detected, the detected user signals are reconstructed, and interference cancellation is performed on the reconstructed signals and all the user signals, where the residual signal after the cancellation includes an interference signal between user signals of different signal processing units. The at least two signal processing units use an interference signal of a user signal in another signal processing unit on a user signal in the signal processing unit in a process of detecting the user signals according to the residual signal after the cancellation; therefore, in the interference cancellation method in this embodiment, a user signal in each signal processing unit can be enabled to use a cancellation gain of a user signal of another signal processing unit, which is advantageous to improvement of a gain of a user signal detected and output by the signal processing unit.

Figure 6:
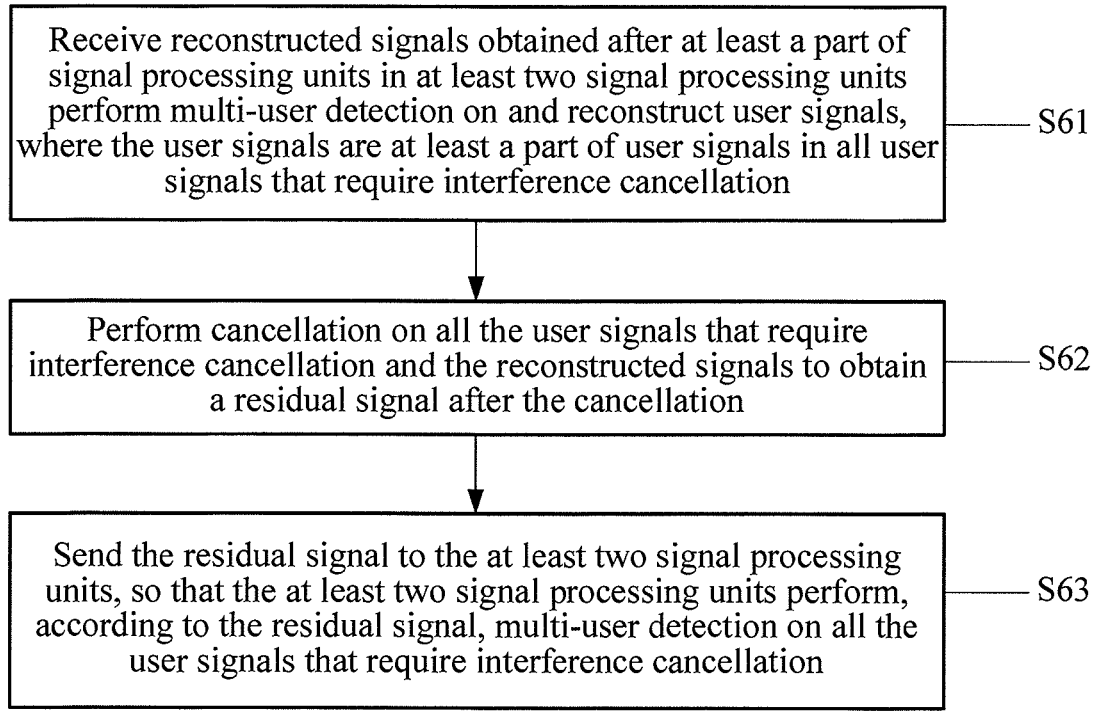
FIG. 6 is a flowchart of a second embodiment of an interference cancellation method according to the present invention.

FIG. 6 is a flowchart of a second embodiment of an interference cancellation method according to the present invention. The interference cancellation method in this embodiment includes:

S61: Receive signals obtained after at least apart of signal processing units in at least two signal processing units detect and reconstruct user signals, where the user signals are at least a part of user signals in user signals that require interference cancellation. The user signals that require interference cancellation may be user signals in a cell. If the user signals that require interference cancellation are baseband signals, the reconstructed signals are baseband signals.

S62: Perform cancellation on the reconstructed signals and the user signals that require interference cancellation.

S63: Send a residual signal after the cancellation to the at least two signal processing units, so that the at least two signal processing units detect, according to the residual signal after the cancellation, the user signals that require interference cancellation. The residual signal includes a signal obtained after subtracting the reconstructed signals from the user signals that require interference cancellation.

In the interference cancellation method in this embodiment, the reconstructed signals sent by the at least a part of signal processing units in the at least two signal processing units are received, the cancellation is performed on the reconstructed signals and the user signals that require interference cancellation, and the residual signal after the cancellation is sent to the at least two signal processing units. Because the residual signal after the cancellation includes an interference signal between user signals of different signal processing units, in the interference cancellation method in this embodiment, a signal processing unit is enabled to use an interference signal of a user signal in another signal processing unit on a user signal in the signal processing unit when the signal processing unit detects the user signal; therefore, in the interference cancellation method in this embodiment, a user signal in each signal processing unit can be enabled to use a cancellation gain of a user signal in another signal processing unit, which is advantageous to improvement of a gain of a user signal detected and output by the signal processing unit.

Figure 7:
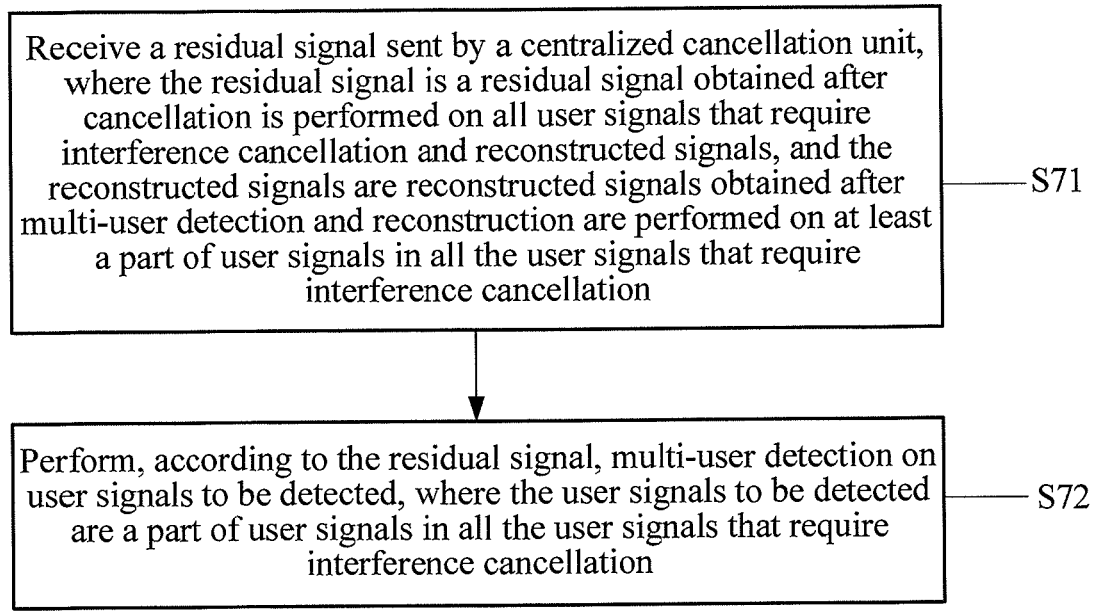
FIG. 7 is a flowchart of a third embodiment of an interference cancellation method according to the present invention.

FIG. 7 is a flowchart of a third embodiment of an interference cancellation method according to the present invention. The interference cancellation method in this embodiment includes:

S71: Receive a residual signal sent by a centralized cancellation unit, where the residual signal is a residual signal obtained after cancellation is performed on all user signals that require interference cancellation and reconstructed signals, and the reconstructed signals are reconstructed signals obtained after multi-user detection and reconstruction are performed on at least a part of user signals in all the user signals that require interference cancellation. Specifically, all the user signals that require interference cancellation may be user signals in a cell. The residual signal may be a residual signal obtained after the cancellation unit subtracts the reconstructed signals from all the user signals that require interference cancellation.

S72: Perform, according to the residual signal, multi-user detection on user signals to be detected, where the user signals to be detected are a part of user signals in all the user signals that require interference cancellation. Specifically, the performing the multi-user detection on the user signals to be detected includes: removing spreading codes from the user signals to be detected; demodulating the user signals from which the spreading codes are removed; and decoding the demodulated user signals, and outputting bit sequences of the user signals.

Furthermore, the user signals to be detected may be a part of user signals in the at least a part of user signals. If the user signals to be detected are a part of user signals in the at least a part of user signals, multi-user detection first needs to be performed on the user signals to be detected, and then, the detected signals are reconstructed to obtain reconstructed signals, where the reconstructed signals are fed back to the centralized cancellation unit. The performing the multi-user detection on the user signals to be detected includes: removing spreading codes from the user signals to be detected; demodulating the user signals from which the spreading codes are removed; and decoding the demodulated user signals, and outputting bit sequences of the user signals. A method for obtaining the reconstructed signals includes: coding the user signals on which the multi-user detection is performed; modulating the coded signals; and performing spreading on the modulated signals.

In the interference cancellation method in this embodiment, the residual signal sent by the centralized cancellation unit is received, and the multi-user detection is performed, according to the residual signal, on the user signals to be detected. Because the residual signal is a residual signal obtained after the cancellation is performed on all the user signals that require interference cancellation and the reconstructed signals, where the reconstructed signals are reconstructed signals obtained after the multi-user detection and reconstruction are performed on the at least a part of user signals in all the user signals that require interference cancellation, the residual signal includes an interference signal of another user signal in all the user signals on the user signals to be detected. In the interference cancellation method in this embodiment, the user signals to be detected can be enabled to use a cancellation gain of another user signal in all the user signals, which is advantageous to improvement of gains of signals output after the multi-user detection is performed on the user signals to be detected.

Figure 8:
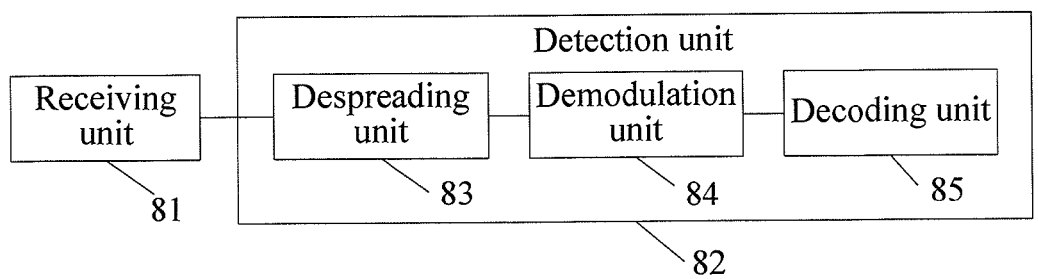
FIG. 8 is a schematic diagram of one embodiment of a signal processing unit according to the present invention.

FIG. 8 is a schematic diagram of one embodiment of a signal processing unit according to the present invention. The signal processing unit in this embodiment may correspond to a board, and is configured to process a user signal on the board. The signal processing unit in this embodiment includes a receiving unit 81 and a detection unit 82. The receiving unit 81 is configured to receive a residual signal sent by a centralized cancellation unit, where the residual signal is a residual signal obtained after cancellation is performed on all user signals that require interference cancellation and reconstructed signals, and the reconstructed signals are reconstructed signals obtained after multi-user detection and reconstruction are performed on at least a part of user signals in all the user signals that require interference cancellation. Specifically, the residual signal is a residual signal obtained after the cancellation unit subtracts the reconstructed signals from all the user signals that require interference cancellation. All the user signals that require interference cancellation are user signals in a cell.

The detection unit 82 is configured to perform, according to the residual signal, multi-user detection on user signals to be detected, where the user signals to be detected are a part of user signals in all the user signals that require interference cancellation. Furthermore, the detection unit includes a despreading unit 83, a demodulation unit 84, and a decoding unit 85. The despreading unit 83 is configured to remove spreading codes from the user signals to be detected. The demodulation unit 84 is configured to demodulate the user signals from which the spreading codes are removed. The decoding unit 85 is configured to decode the demodulated user signals and output bit sequences of the user signals.

The signal processing unit in this embodiment receives the residual signal sent by the centralized cancellation unit, and performs, according to the residual signal, the multi-user detection on the user signals to be detected. Because the residual signal is a residual signal obtained after the cancellation is performed on all the user signals that require interference cancellation and the reconstructed signals, where the reconstructed signals are reconstructed signals obtained after the multi-user detection and reconstruction are performed on the at least a part of user signals in all the user signals that require interference cancellation, the residual signal includes an interference signal of another user signal in all the user signals on the user signals to be detected. The signal processing unit in this embodiment can enable the user signals to be detected to use a cancellation gain of another user signal in all the user signals, which is advantageous to improvement of a gain of a signal output by the signal processing unit.

The signal processing unit in this embodiment and the interference cancellation method, apparatus, and system may also be used for users of different cells, and an interference cancellation principle is similar to an interference cancellation principle of a user signal in a cell, which is not repeatedly described herein.

The foregoing disclosures are only multiple embodiments of the present invention, and certainly are not intended to limit the scope of the claims of the present invention; therefore, any equivalent variation made according to the claims of the present invention still falls within the scope of the present invention.

What is claimed is:

1. An interference cancellation system, comprising:
a centralized cancellation unit and at least two signal processing units, wherein each of the at least two signal processing units corresponds to a board, and is configured to process user signals on the board, and at least one signal processing unit in the at least two signal processing units is configured to perform multi-user detection on at least a part of user signals in all user signals input into the interference cancellation system, and reconstruct the detected user signals to obtain reconstructed signals;
the centralized cancellation unit is configured to perform cancellation on the reconstructed signals and all the user signals input into the interference cancellation system to obtain a residual signal after the cancellation, and feed back the residual signal to the at least two signal processing units; and the at least two signal processing units are configured to perform, according to the residual signal, multi-user detection on all the user signals input into the interference cancellation system and output the detected signals.

2. The interference cancellation system according to claim 1, wherein the centralized cancellation unit is disposed in one of the at least two signal processing units.

3. The interference cancellation system according to claim 1, further comprising a controller, wherein each signal processing unit in the at least two signal processing units receives all the user signals input into the interference cancellation system, and the controller is configured to control each signal processing unit to select a part of user signals from all the received user signals, so that each signal processing unit performs multi-user detection on the selected user signals.

4. The interference cancellation system according to claim 1, wherein each signal processing unit in the at least two signal processing units comprises a detection unit, and the at least one signal processing unit performs the multi-user detection on the at least a part of user signals by adopting the detection unit, and the at least two signal processing units perform, according to the residual signal and by adopting the detection unit, the multi-user detection on all the user signals input into the interference cancellation system.

5. The interference cancellation system according to claim 4, wherein the detection unit comprises:
a despreading unit, configured to remove spreading codes from the user signals;
a demodulation unit, configured to demodulate the user signals from which the spreading codes are removed; and
a decoding unit, configured to decode the demodulated user signals and output bit sequences of the user signals.

6. The interference cancellation system according to claim 5, wherein the at least one signal processing unit in the at least two signal processing units further comprises a signal reconstruction unit, configured to reconstruct the user signals on which the multi-user detection is performed.

7. The interference cancellation system according to claim 6, wherein the signal reconstruction unit comprises:
a coding unit, configured to code the signals output by the detection unit;
a modulation unit, configured to modulate the coded signals; and
a spreading unit, configured to perform spreading on the modulated signals to obtain the reconstructed signals.

8. The interference cancellation system according to claim 1, wherein all the user signals input into the interference cancellation system are user signals in a cell.

9. The interference cancellation system according to claim 1, wherein all the user signals input into the interference cancellation system are baseband user signals, and the reconstructed signals are reconstructed baseband user signals.

10. The interference cancellation system according to claim 1, wherein the residual signal is a residual signal obtained after the centralized cancellation unit subtracts the reconstructed signals from all the user signals input into the interference cancellation system.

11. An interference cancellation method, comprising:
performing, by at least one signal processing unit in at least two signal processing units, multi-user detection on at least a part of user signals in all user signals that require interference cancellation, and reconstructing the detected user signals to obtain reconstructed signals;

performing, by a centralized cancellation unit, cancellation on all the user signals that require interference cancellation and the reconstructed signals to obtain a residual signal after the cancellation, and feeding back the residual signal to the at least two signal processing units;

performing, by the at least two signal processing units and according to the residual signal, multi-user detection on all the user signals that require interference cancellation and outputting the detected signals; and wherein each of the at least two signal processing units corresponds to a board, and is configured to process user signals on the board.

12. The interference cancellation method according to claim 11, wherein each signal processing unit in the at least two signal processing units receives all the user signals that require interference cancellation, and each signal processing unit selects a part of user signals from all the received user signals that require interference cancellation, so that each signal processing unit performs multi-user detection on the selected user signals.

13. The interference cancellation method according to claim 11, wherein performing multi-user detection on at least a part of user signals comprises:
removing spreading codes from the user signals;
demodulating the user signals from which the spreading codes are removed; and
decoding the demodulated user signals and outputting bit sequences of the user signals.

14. The interference cancellation method according to claim 11, wherein performing, according to the residual signal, multi-user detection on all the user signals that require interference cancellation comprises:
removing spreading codes from the user signals;
demodulating the user signals from which the spreading codes are removed; and
decoding the demodulated user signals and outputting bit sequences of the user signals.

15. The interference cancellation method according to claim 11, wherein reconstructing the detected user signals comprises:
coding the detected user signals;
modulating the coded signals; and
performing spreading on the modulated signals to obtain the reconstructed signals.

16. The interference cancellation method according to claim 11, wherein all the user signals that require interference cancellation are user signals in a cell.

17. The interference cancellation method according to claim 11, wherein all the user signals that require interference cancellation are baseband user signals, and the reconstructed signals are reconstructed baseband user signals.

18. The interference cancellation method according to claim 11, wherein performing cancellation on all the user signals that require interference cancellation and the reconstructed signals to obtain a residual signal after the cancellation comprises:
subtracting the reconstructed signals from all the user signals that require interference cancellation to obtain the residual signal.

* * * * *